Oct. 21, 1969  J. O. KING, JR  3,473,431
BLIND FASTENER

Filed Feb. 13, 1968  2 Sheets-Sheet 1

INVENTOR.
JOHN O. KING, JR.

BY
Newton, Hopkins,
Jones & Ormsby
ATTORNEYS

Oct. 21, 1969 J. O. KING, JR 3,473,431
BLIND FASTENER
Filed Feb. 13, 1968 2 Sheets-Sheet 2
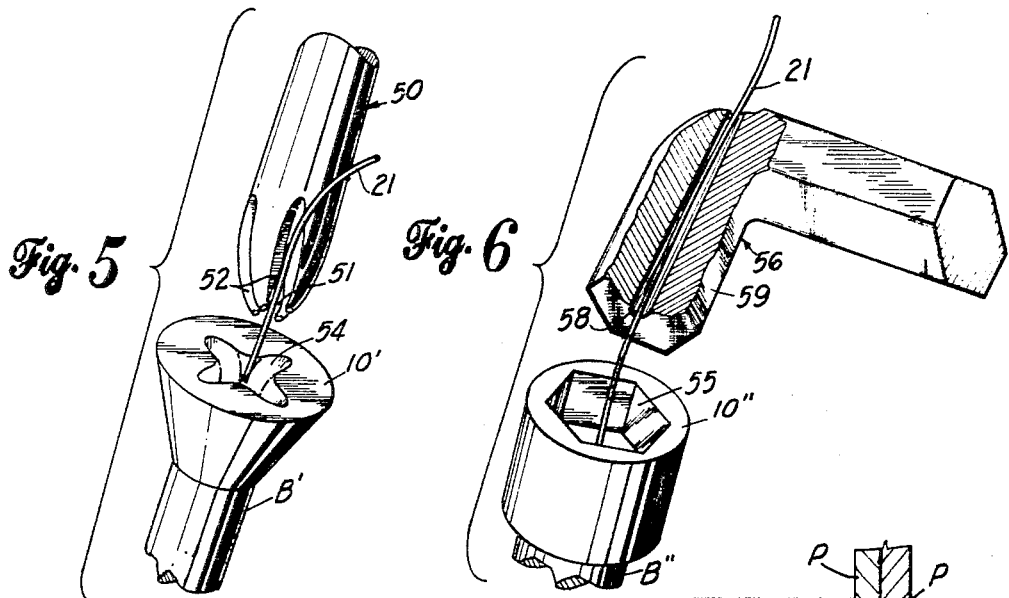
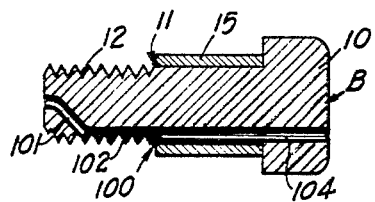
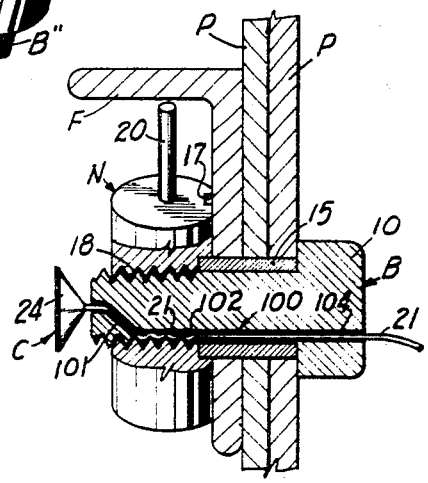
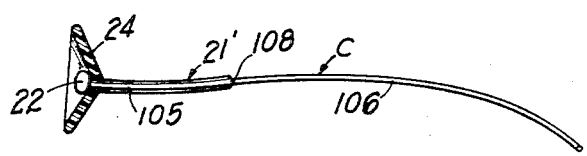
INVENTOR.
JOHN O. KING, JR.
BY
Newton, Hopkins,
Jones & Ormsby
ATTORNEYS United States Patent Office 3,473,431
Patented Oct. 21, 1969

3,473,431
BLIND FASTENER
John O. King, Jr., 110 Lake Forrest Lane,
Atlanta, Ga. 30305
Filed Feb. 13, 1968, Ser. No. 705,178
Int. Cl. F16b 35/04, 39/24, 39/00
U.S. Cl. 85—3                                5 Claims

ABSTRACT OF THE DISCLOSURE

A blind fastener for fastening a plurality of work pieces together including a bolt, a nut for threadably engaging the bolt, and means for moving the nut into engaging position on the bolt from that side of the plurality of work pieces which is opposite the side on which the nut is to be positioned. The bolt includes a head and a shank which is threaded and slidably insertable through aligned holes in the work pieces. The nut will slidably pass through the aligned holes in the work pieces in a first position, but will not pass through the holes in a second position. The means connecting the nut and bolt moves the nut from the first position to the second position to be threaded onto the bolt after the nut has passed through the work pieces.

BACKGROUND OF THE INVENTION

Field of invention

This invention relates generally to blind fasteners for fastening together work pieces with aligned holes therethrough from one side of the work pieces; and more particularly to a blind fastener construction having an externally threaded bolt, an internally threaded nut which can be inserted through the holes in the work pieces in a first position but not in a second position, and means for moving the nut from the first position to the second position for engaging the bolt after the nut has been inserted through the holes in the work pieces from that side of the plurality of work pieces which is opposite the side on which the nut is to be positioned.

Description of the prior art

Blind fasteners are well known in the prior art. Probably the most common of these are toggle bolts, expansion bolts and blind rivets. The expansion bolts and blind rivets utilize deformation of a part of the bolt or rivet to lock the fastener in place. This greatly limits the strength of the fastener and thus the application thereof since some part of the fastener must be soft enough to be deformed to lock the fastener in place.

Moreover, once an expansion bolt or blind rivet is used, the complete fastener has to be destroyed to remove the fastener from the work pieces. This precludes reuse of any part of the fastener and thus increases the repair cost of any article utilizing such fasteners. Also, these fasteners have generally required special tools for their installation thereby increasing the cost of installation.

The toggle bolt does not utilize deformation of the fastener to lock the fastener in place, but instead utilizes a movable member which is pivoted to an internally threaded ring to lock the fastener in place. Since the strength of the pivotal connection between the movable member and the threaded ring is limited, the application of the toggle fastener is also limited. Moreover, the diameter of the bolt utilized in the toggle bolt construction must be considerably smaller than the hole in a work piece to allow passage of the movable member through the work piece. This substantially precludes the effective use of the toggle bolt construction where the bolt must carry a bearing load.

SUMMARY OF THE INVENTION

These and other problems associated with prior art blind fastener constructions are overcome by the invention disclosed herein by providing a strong assembly utilizing a unitary bolt and a unitary nut. Since both the nut and bolt are of a simple unitary construction, the strength and efficiency of the structure is greatly increased and the cost of production therof is greatly reduced.

The invention can be installed with conventional tools or by an inexpensively modified conventional tool so that the installation cost of the fastener is kept to a minimum. Also, the bolt of the invention can be re-used since the fastener is not destroyed upon removal of the fastener from the work pieces. Since the nut of the fastener is not carried by the bolt during insertion of the fastener through the work pieces, the shank of the bolt can be constructed so that a bearing load can be carried by the fastener.

The apparatus of the invention includes a bolt, a nut for threadably engaging the bolt, and means for moving the nut into engaging position on the bolt from that side of the work pieces which is opposite the side on which the nut is to be positioned. The bolt includes a head, and a threaded shank for slidable insertion through the holes in the work pieces. The nut has two dimensions less than the diameter of the holes through the work pieces and one dimension greater than the diameter of the holes. This allows the nut to pass through the holes in the work pieces when in a first position in which the greater dimension of the nut is aligned with the holes but the nut will not pass through the holes in a second position in which the greater dimension of the nut is transversely positioned across the holes. The means for positioning the nut includes a flexible member passing along or through the bolt and connected to the nut in such a manner that the nut can be moved from the first to the second position from that side of the work pieces on which the head of bolt is positioned.

The apparatus also includes a stop means connected to the nut for limiting the rotation of the nut so that the bolt may be threaded into the stationary nut to hold the work pieces together.

These and other features and advantages of the invention will be more clearly understood upon consideration of the following detail description and accompanying drawings wherein like characters of reference designate corresponding parts throughout and in which:

BRIEF DESCRIPTION OF THE DRAWINGS

FIG. 5 is a perspective view of a modified Phillips-type screw driver for installing the fastener of the invention; and, FIG. 6 is a partial cross-sectional view of a modified Allen wrench for installing the fastener of the invention;

FIG. 7 is a cross-sectional view of a bolt of a second embodiment of the invention;

FIG. 8 is a cross-sectional view of the second embodiment of the invention as it is being installed; and, FIG. 9 is an elevational view of a second embodiment of the positioning means of the invention.

DESCRIPTION OF ILLUSTRATIVE EMBODIMENTS

The apparatus of the invention comprises generally a bolt B, a nut N, and a positioning means C for moving the nut N into threaded engagement with the bolt B. The apparatus of the invention is utilized to attach together a plurality of work pieces P, especially work pieces which allow access to only one side thereof for installing the apparatus of the invention. The work pieces P have aligned holes H therethrough with a common centerline AA.

Figure 1:
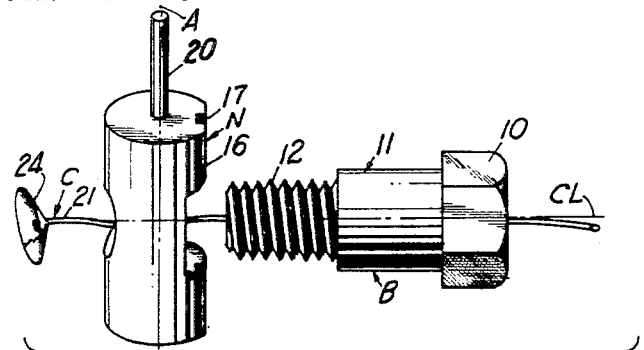
FIG. 1 is an exploded elevational view of one embodiment of the invention.
Figure 2:
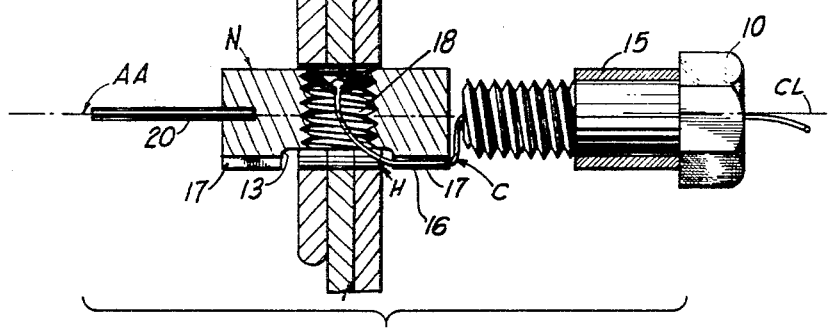
FIG. 2 is a cross-sectional view of that embodiment of the invention shown in FIG. 1 as it is being installed.
Figure 3:
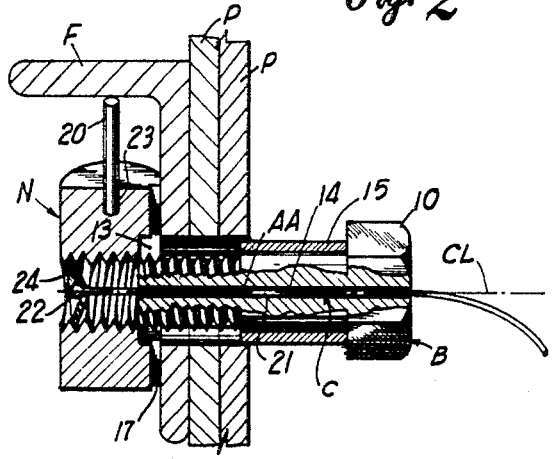
FIG. 3 is a cross-sectional view as seen in FIG. 2 as the nut of the invention is being positioned on the bolt.

The bolt B includes an enlarged head 10 and an elongated shank 11, the shank 11 having a portion thereof conventionally threaded as at 12. The bolt B may have a tapered or straight shank 11, the shank 11 being shown here as straight. In the first embodiment of the invention, it will be seen that the bolt B has a passage 14 extending along the centerline CL thereof to be utilized in a manner set forth hereinbelow. The threaded portion 12 of the shank 11 has a diameter less than the diameter of the unthreaded portion of the shank 11 as shown in FIG. 1. In the alternative, however, a bushing 15 may be utilized around the unthreaded portion of the shank 11, as illustrated in FIGS. 2 and 3, to increase the effective diameter thereof.

The nut N has two dimensions less than the minimum diameter of the holes H. The nut N can have any of a number of different shapes, but is illustrated herein as being generally cylindrical with a longitudinal axis A and a flattened bearing surface 16 on one side thereof. The surface 16 provides a bearing contact between the nut N and the work pieces P as will be explained more fully hereinafter. A centrally located, conventionally threaded, aperture 18 is provided through the nut N perpendicular to the surface 16 and the longitudinal axis A. The aperture 18 is of sufficient size and configuration to be threadably received on the portion 12 of the shank 11 when the longitudinal axis A of the nut N is disposed transversely of the centerline CL of the bolt B.

A counterbore 13 of a diameter sufficient to be received over the enlarged unthreaded portion of the shank 11 or the bushing 15 is provided concentrically of the aperture 18 at the bearing surface 16. The counterbore 13 will accommodate different thicknesses of work piece φ without interference of the nut N with the enlarged portion of the shank 11 or the bushing 15. A longitudinally extending positioning recess 17 is provided along the center of the surface 16 to provide for the flush positioning of the positioning means C as will be explained hereinafter.

The diameter of the enlarged portion of the shank 11 or the bushing 15 is such that the shank 11 will be slidably received through the holes H in the work pieces P and provide bearing contact with the work pieces P when the bolt B is installed. The diameter of the nut N is approximately equal to or slightly less than the diameter of the enlarged portion of the shank 11 or the bushing 15 so that, when the longitudinal axis of the nut N is aligned with the common centerline AA of the holes H in a first position, the nut N can be slidably passed through the holes H. The length of the nut N is such that the nut N will not poss through the holes H when the longitudinal axis A of the nut N is located transversely of the common centerline AA of the holes H in a second position. It will be noted that the nut N can be threaded onto the shank 11 in the second position.

Since the threaded portion 12 of the shank 11 has a diameter less than the enlarged portion of the shank 11 or the bushing 15, the diameter of the aperture 18 is therefore smaller than the diameter of the nut N and enough material remains at the thinnest section of the nut N to provide adequate strength for the nut N to fasten the work pieces P together. While any of a number of diameters for the threaded portion 12 of the shank 11 and the aperture 16 may be utilized, it has been found that utilizing a diameter of approximately three-fourths of the diameter of the enlarged portion of the shank 11 or the bushing 15 is satisfactory for the threaded portion 12 and aperture 16.

A stop 20 extends from one end of the nut N outwardly along the longitudinal axis A to be utilized in attaching the nut N on the bolt B, as will be more fully explained hereinafter. The stop 20 may be of any convenient shape and length, the shape shown here being cylindrical and substantially less in diameter than the nut N. The stop 20 may be attached to the nut N through a recess 23 into which the stop 20 may be press fitted. By supplying stops 20 of different lengths, an appropriate stop 20 may be selected for each application and pressed into the recess 23.

The positioning means C may be of any one of a plurality of designs, however, the connecting means illustrated herein includes a flexible pull portion 21 of a diameter sufficiently small to be slidably received through the passage 14 through the bolt B, and an enlarged check portion 22 at one end thereof. A connector 24 of a resilient material such as nylon and having the shape of a conical washer is received along the flexible pull portion 21 of the means C until it is engaged by the enlarged check portion 22 of the pull portion 21. The connector 24 is of such a diameter that it can be slipped into position in the threaded aperture 18 and resiliently retained therein so as to position the pull portion 21 centrally in the aperture 18. When the pull portion 21 of the means C is extended through the guide passage 14 of the bolt B and pulled, the nut N will be positioned against the threaded portion 12 of the shank 11. Thus, when the bolt B is turned with respect to the nut N, the nut N will be threadably received on the threaded portion 12 of the shank 11. The conventional threads of the shank 11 and the aperture 18 are sufficiently self-aligning so that the nut N and bolt B will mate properly.

The connector 24 may be made integral with the pull portion 21 without departing from the concept of the invention. The connector 24 may also be made of some easily destructible material such as a foamed plastic since the only requirement for the effective operation of the connector is that it position the pull portion 21 centrally in the aperture 18 to insure correct positioning of the nut N with respect to the bolt B for receipt of the nut N on the threaded portion 12 of the shank 11. Once the nut N is in position on the bolt B, the connector 24 is usually destroyed in the process of tightening the fastener.

While the enlarged head 10 of the bolt B is illustrated in a shape to be engaged by a conventonal open end or box end wrench (not shown), the head 10 may be of any deseign to receive different types of installation tools such as screw drivers, Allen wrenches or sockets. The installation tools may, however, have to be slightly modified to be utilized with the fastener of the invention. A head 10' is illustrated in FIG. 5 to be installed by a Phillips-type screw driver. The tool or screw driver 50 illustrated is a conventional Phillips-type screw driver with a slot 51 cut across the point 52 to allow the pull portion 21 to pass freely thereby when the point 52 is positioned in the slots 54 of the head 10' to tighten the bolt B'.

A head 10" is shown in FIG. 6 with a driving recess 55 therein to receive an Allen wrench tool 56 therein. The tool 56 is a conventional Allen wrench with a hole 58 through the driving end 59 thereof to slidably receive the pull portion 21 therethrough during the installation of the bolt B".

A second embodiment of the invention is shown in FIGS. 7 and 8. In this embodiment of the invention, a guide 100 is provided longitudinally along the periphery of the shank 11 rather than the passage 14 along the center of the shank 11. The guide 100 comprises an angled passage 101 opening onto the extending end of the threaded portion 12 and into the threads of the portion 12 a distance from the extending end of the portion 12. That end of the passage 101 opening through the threads of the section 12 communicates with a slot 102 extending rearwardly along the shank 11 to the head 10. A hole 104 through the head 10 communicates with the slot 102 so that the pull portion 21 of the means C will pass through the head 10 to install the nut N. The slot 102 is of such design that the pull portion 21 is positioned in interference with the threads of the nut N as it is screwed on the shank 11 to lock the nut N in position when the fastener is installed. This is shown in FIG. 8.

FIG. 9 illustrates a second embodiment of the positioning means C which will seal the passage 14 or the hole 104 and prevent moisture and other foreign matter from passing through the bolt B. The second embodiment utilizes a connector 24 similar in construction to the first embodiment thereof and a pull portion 21′ which has an enlarged sealing portion 105 and a grasping portion 106. The portion 105 is adjacent the connector 24 and is of sufficient diameter to seal the passage 14 or hole 104 when the nut N has been positioned for receipt on the threaded portion 12 of the shank 11. The grasping portion 106 passes freely through the passage 14 or hole 104 to permit easy installation of the fastener.

After the fastener is installed, the grasping portion 106 severed from the sealing portion 105 to provide a smooth finish for the fastener. A reduced diameter breaking groove 108 may be provided between the portions 105 and 106 to simplify this severing operation.

OPERATION

The first embodiment of the invention is installed by inserting the connector 24 in the aperture 18 of the nut N and threading the pull portion 21 of the means C through the passage 14 in the bolt B. Next the nut N is positioned so that the longitudinal axis A thereof is in alignment with the centerline CL of the bolt B and the pull portion 21 is positioned in the recess 17. The nut N and bolt B are then arranged in a first position so that the axis A and centerline CL are aligned with the centerline AA of the holes H. This positions that dimension of the nut N greater than the diameter of the holes H in alignment with the holes H so that the nut N and bolt B can be inserted through the holes H as is best shown in FIG. 2.

The nut N will then drop down behind the work pieces and be supported by the positioning means C. The portion 21 is then pulled while the bolt B is held in position to position the nut N at the end of the threaded portion 12 to be threaded thereon. This is shown in FIG. 3. When the nut N is arranged for threading onto bolt B, it is in its second position wherein the axis A of the nut N is transverse of the centerline AA of the holes H and the centerline of the aperture 18 is aligned with the centerline of the holes H. That dimension of the nut N which is greater than the diameter of the holes H is now positioned transversely across the holes H.

The bolt B is turned to thread the nut N onto the bolt B. The nut N is prevented from turning by the stop 20 striking a flange F positioned on the blind side of the work pieces as shown in FIG. 3.

The flange F is not necessary if a plurality of fasteners are to be installed and are sufficiently close together for the stop 20 to engage the adjacent nut N during installation. Also, the stop 20 may be eliminated if some other means such as an adhesive on the surface 16 is utilized to prevent the nut from turning.

Figure 4:
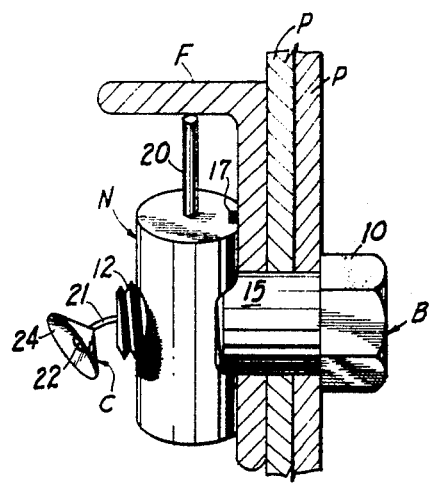
FIG. 4 is a cross-sectional view as seen in FIGS. 2 and 3 after the invention is fully installed.

After the nut N has been threaded onto the shank 11, the bolt B is torqued up in conventional manner. The connector 24 is forced from the aperture 18 as the bolt B is tightened so that it will not interfere with the operation of the bolt. This is shown in FIG. 4.

In installing the bolt B′ shown in FIG. 5, the nut N, bolt B′ and positioning means C are arranged and inserted through holes H as set forth hereinbefore. When the portion 21 is pulled, the tool 50 is inserted in the slots 54 to rotate the bolt B′. The pull portion 21 can still be pulled since it passes through the slot 51. The bolt B′ is then tightened by rotating the tool 50.

In installing the bolt B″ shown in FIG. 6, the nut N the bolt B′ and positioning means C are arranged and inserted through holes H as set forth hereinbefore. The tool 56 is then inserted in the driving recess 55 as the portion 21 is passed through the hole 58 in the tool 56. The pull portion 21 is then pulled and the tool 56 rotated to tighten the bolt B″.

The second embodiment of the bolt B shown in FIGS. 7 and 8 is installed just as the first embodiment thereof. It will be noted that the pull portion 21 in the slot 102 is projected into interference with the threads in the nut N as the nut N is tightened on the bolt B. Thus, the threads of the nut N cut into the portion 21 and serve to prevent inadvertent loosening of the nut N under load.

The second embodiment of the positioning means C, shown in FIG. 9, is utilized for the same purpose as the first embodiment thereof. When the sealing portion 105 is pulled through the passage 14 or hole 104, it seals the same to prevent moisture and other foreign material from entering the blind space behind the work pieces P. When the bolt B and the nut N are fully installed the grasping portion 106 is pulled to break the portion 21′ at the breaking groove 108.

The bolts B, B′ and B″ can be removed simply by loosening them until the nut N falls therefrom. These same bolts B, B′ and B″ can be re-installed by using another nut N and positioning means C. This reduces the cost of replacement of the fastener appreciably.

Thus, having described the invention, it will be apparent to those skilled in the art that various modifications may be made to the invention without departing from the spirit or scope thereof.

What is claimed as invention is:

1. A blind fastener for fastening together a plurality of work pieces comprising:
   a bolt having an enlarged head and an elongated shank which is slidably insertable through aligned holes in the plurality of work pieces and which has a threaded portion on the extending end;
   a nut having two dimensions less than the diameter of the aligned holes and one dimension greater than the diameter of the aligned holes, said nut having a threaded aperture transverse to said greater dimension for threadably engaging said threaded portion of said shank; and
   positioning means for moving said nut from a first position in which said greater dimension of said nut is aligned with the holes in the work pieces for the passage of said nut through the holes to a second position in which said nut is threadably engaging said bolt and said greater dimension of said nut is transversely across the holes in the work pieces for precluding the passage of said nut through said holes, said shank having an unthreaded portion with a diameter substantially equal to the diameter of the holes through the work pieces and a length at least as great as the maximum total combined thickness of the work pieces with which the fastener will be used, said threaded portion having a diameter less than the diameter of the unthreaded portion of said shank, and said nut having a diameter substantially equal to the diameter of the holes through the work pieces and defining a counterbore concentric about said aperture with a diameter sufficient to receive the extending end of said unthreaded portion extending through said work pieces.

2. The fastener of claim 1 further including stop means including a member extending longitudinally and axially of said nut from one end thereof and means carried by said work pieces for engaging said member and preventing rotation of said nut.

3. A blind fastener for fastening together a plurality of work pieces comprising:

a bolt having an enlarged head and an elongated shank which is slidably insertable through aligned holes in the plurality of work pieces and which has a threaded portion on the extending end;

a nut having two dimensions less than the diameter of the aligned holes and one dimension greater than the diameter of the aligned holes, said nut having a threaded aperture transverse to said greater dimension for threadably engaging said threaded portion of said shank; and positioning means for moving said nut from a first position in which said greater dimension of said nut is aligned with the holes in the work pieces for the passage of said nut through the holes to a second position in which said nut is threadably engaging said bolt and said greater dimension of said nut is transversely across the holes in the work pieces for precluding the passage of said nut through said holes, said positioning means including a flexible pull portion having a length greater than the length of said bolt, and said bolt defining a guide means therein for the passage of said pull portion therethrough, the construction and arrangement of said guide means positioning said pull portion in interference with the threads on said nut to lock said nut in position on said bolt.

4. The fastener of claim 2 wherein said guide means includes an angled passage opening onto the forward end of said shank and into the threads of said threaded portion of said shank, an axially extending slot communicating with said passage and extending along said shank with said slot opening onto a portion of the threads thereon, the depth of said slot from the roots of the threads to the radially inner surface of said slot being less than the diameter of said pull portion, whereby said pull portion interferes with the threads on said nut to provide a means for preventing inadvertent loosening of the nut and a hole defined through said head and communicating with said slot for the passage of said pull portion therethrough.

5. A blind fastener for fastening together a plurality of work pieces with aligned holes therethrough comprising:

a bolt including a head and a shank, said shank having an unthreaded portion with substantially the same diameter as the holes through the work pieces and slidably receivable through the holes in bearing contact with the work pieces, and having a threaded portion opposite said head of a diameter substantially three-fourths the diameter of said unthreaded portion; said bolt defining a passage along the centerline thereof extending through the length of said bolt;

a substantially cylindrical nut having a diameter substantially equal to the diameter of said unthreaded portion of said shank for slidable receipt through the holes in the work pieces when the longitudinal axis thereof is aligned with the centerline of the holes and having a length greater than the diameter thereof for precluding passage of said nut through the holes when the longitudinal axis of the nut is substantially perpendicular to the centerline of the holes; said nut defining a centrally located, threaded aperture therethrough perpendicular to the longitudinal axis of said nut and having a diameter substantially equal to the diameter of said threaded portion of said shank for said nut to be threaded onto said shank when the longitudinal axis of said nut is perpendicular to the centerline of said bolt; said nut also defining a flat bearing surface along the length thereof parallel to the longitudinal axis of said nut and perpendicular to said aperture, and a recess in said surface extending along the length of said surface and communicating with said aperture to receive a positioning means during insertion of said nut through said holes;

a cylindrical stop member extending from one end of said nut and having a diameter substantially less than said nut and a length sufficient to interfere with some portion of the work pieces when the longitudinal axis of said nut is perpendicular to the centerline of the holes through the work pieces and said aperture is aligned about the centerline of the holes through the work pieces;

flexible means for moving said nut from a position in which the longitudinal axis of said nut is aligned with the centerline of the holes in the work pieces to a position in which the longitudinal axis of said nut is perpendicular to the centerline of the holes and said aperture through said nut is aligned about the centerline of the holes; said flexible means including a flexible portion having a diameter slightly less than the diameter of said passage through said bolt and substantially no greater than the depth of said recess in said flat bearing surface, and a resilient connector connected to said flexible portion and constructed and arranged to engage said nut in said aperture and position the flexible portion centrally of said aperture; said connector being effective to position said nut for threading onto said bolt when said flexible portion is passed through said passage through said bolt and pulled to move said nut toward said bolt.

References Cited

UNITED STATES PATENTS

| | | | |
|---|---|---|---|
| 1,506,123 | 8/1924 | Hubener. | |
| 2,611,459 | 9/1952 | Hammitt et al. | 85—3 |
| 2,765,134 | 10/1956 | Hill | 85—3 |
| 2,933,969 | 4/1960 | Huyssen | 85—3 |
| 3,211,042 | 10/1965 | Fischer | 85—3 |
| 3,244,056 | 4/1966 | Kern | 85—3 |

RAMON S. BRITTS, Primary Examiner

U.S. Cl. X.R.

151—7, 44; 287—189.36